United States Patent [19]
Grunewald et al.

[11] 4,267,748
[45] May 19, 1981

[54] RELEASABLE LOCK MECHANISM

[75] Inventors: Lynn O. Grunewald, Cudahy; Steven J. Hipp, Milwaukee, both of Wis.

[73] Assignee: Rite Hite Corporation, Milwaukee, Wis.

[21] Appl. No.: 947,886

[22] Filed: Oct. 2, 1978

[51] Int. Cl.³ .............................................. G05G 5/06
[52] U.S. Cl. ....................................... 74/529; 74/535; 74/577 S; 74/578
[58] Field of Search ................. 74/529, 533, 534, 535, 74/536, 537, 538, 577 S, 578, 575, 577 R; 188/82.77

[56] References Cited

U.S. PATENT DOCUMENTS

| | | | |
|---|---|---|---|
| 977,634 | 12/1910 | Klasing | 74/535 |
| 1,168,382 | 1/1916 | Faas et al. | 74/535 |
| 1,708,145 | 4/1929 | McGrew | 74/538 |
| 2,732,730 | 1/1956 | Sernaker | 74/577 |
| 3,211,269 | 10/1965 | Emig | 74/577 |

FOREIGN PATENT DOCUMENTS 1412410  11/1975  United Kingdom .................. 74/575

*Primary Examiner*—Kenneth Dorner

*Attorney, Agent, or Firm*—Neuman, Williams, Anderson & Olson

[57] ABSTRACT

A releasable lock mechanism is provided in combination with a stationary first member and a second member, the latter being adapted to assume various selected positions of rotary adjustment with respect to the first member. The lock mechanism includes a first lock component carried by one of the members and a complemental pivotally adjustable second lock component carried by the other member. The first lock component has a rounded periphery which is provided with a plurality of annularly spaced pockets; each pocket corresponding to a selected position of rotary adjustment of the second member with respect to the first member. The second lock component assumes an interlocking engagement with a peripheral pocket, when the second member is disposed at a selected position of rotary adjustment with respect to the first member, and retains the second member in the selected position. The second lock component is adapted to be manually shiftable relative to its pivotal axis and away from the peripheral pocket of the first lock component to effect unlocking of the lock components.

8 Claims, 12 Drawing Figures

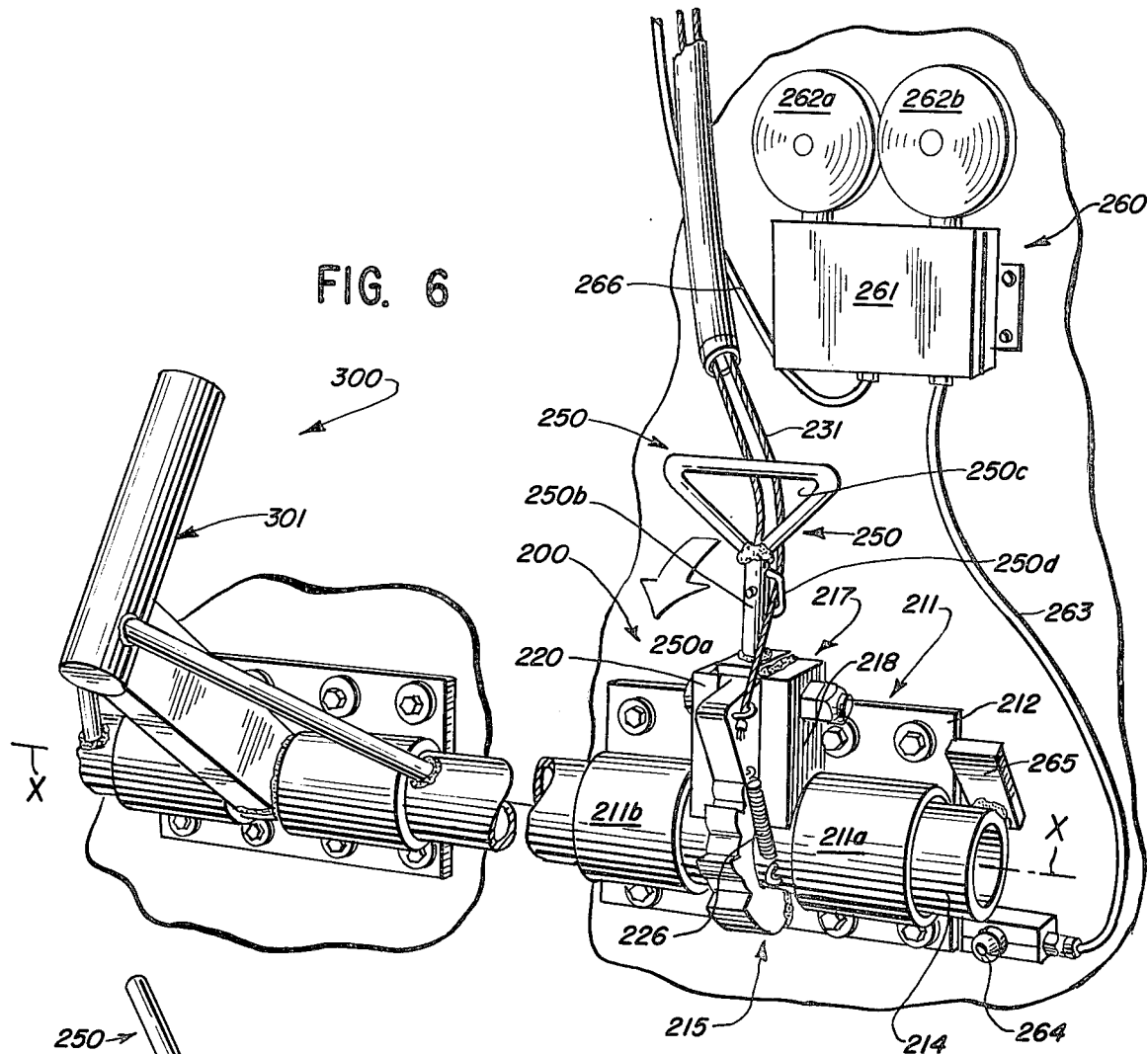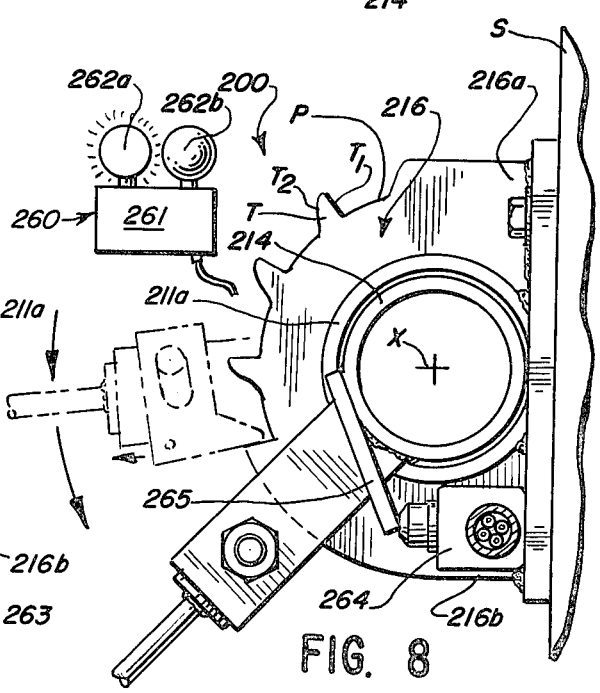

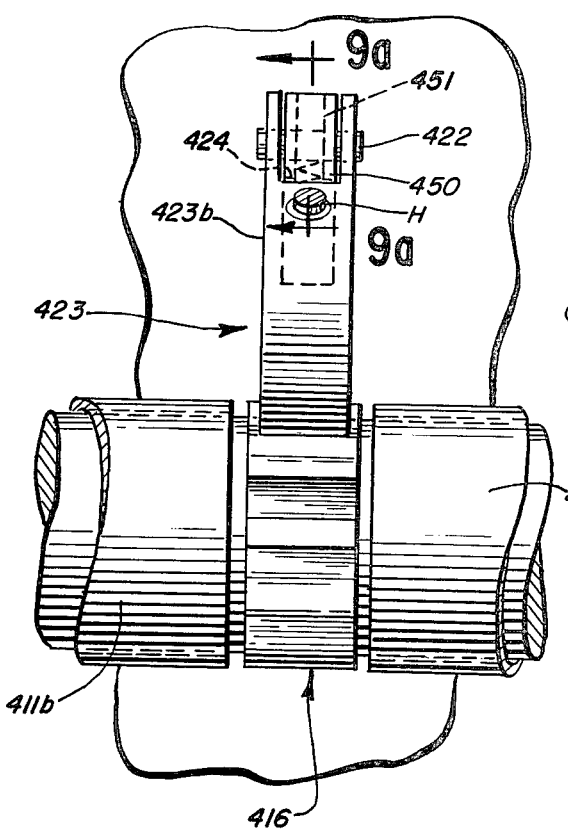
FIG. 10
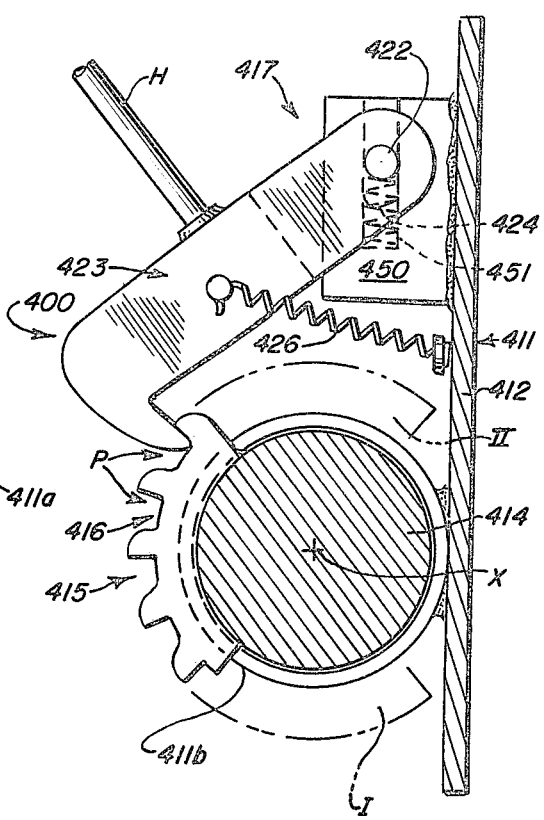
FIG. 9
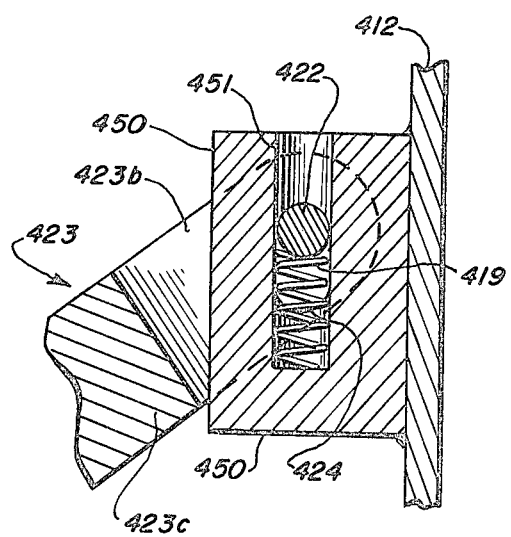
FIG. 11
FIG. 9a

RELEASABLE LOCK MECHANISM

BACKGROUND OF THE INVENTION

Various lock mechanisms have heretofore been provided for releasably securing one member in a selected position of rotary adjustment relative to a second member; however, because of certain inherent structural characteristics, these mechanisms are beset with one or more of the following shortcomings: (a) the mechanism is of costly and complex construction; (b) the mechanism is readily susceptible to malfunction and requires an inordinate amount of servicing and repair; (c) the mechanism is difficult to operate and is unreliable; and (d) the mechanism requires an awkward and time-consuming manipulation to effect locking and/or unlocking of the mechanism.

SUMMARY OF THE INVENTION

Thus, it is an object of the invention to provide a lock mechanism which avoids all of the aforenoted shortcomings.

It is a further object of the invention to provide a lock mechanism which is of compact construction and enables the operator to readily select numerous positions of rotary adjustment.

It is a still further object of the invention to provide a releasable lock mechanism which does not require electrical, pneumatic or hydraulic sources of power to effect operation of the mechanism.

It is a still further object to provide a mechanism which requires a simple, expedient manual manipulation to effect locking and/or unlocking of the mechanism.

It is still a further object to provide a releasable lock mechanism which will compensate for increased force being applied to one of the components after the components are in locked relation without causing the components to become unlocked or either of the components to become damaged.

Further and additional objects will appear from the description, accompanying drawings and appended claims.

In accordance with one embodiment of the invention, a releasable lock mechanism is provided in combination with a stationary first member and a second member mounted for rotary movement between an inoperative position and a plurality of selected operative positions relative to the first member. A first lock component is fixedly carried on one of the members and is provided with at least a curved peripheral segment having a plurality of annularly spaced pockets formed therein; each pocket corresponding to a selected operative position of said second member. A complemental pivotally mounted second lock component is carried by the other member and interlocks with a pocket of said first lock component when the second member assumes a selected operative position. When the lock components are in interlocking relation, the members are releasably retained in a selected relative position with respect to one another. The second lock component, when in interlocking position, is adapted to have the pivotal axis thereof shiftable relative to one of the members while said lock components remain in interlocking relation.

DESCRIPTION

For a more complete understanding of the invention, reference should be made to the drawings wherein:

FIG. 6 is a fragmentary perspective front view of a third form of the improved lock mechanism shown in combination with a device utilized at a loading dock for trucks and the like.

FIGS. 7 and 8 are fragmentary side elevational views of the mechanism shown in FIG. 6 with the second member thereof shown in two different positions of pivotal adjustment.

FIG. 9 is a fragmentary sectional view similar to FIG. 2 but showing a fourth form of the improved lock mechanism.

FIG. 9a is an enlarged fragmentary sectional view taken along line 9a—9a of FIG. 10.

FIG. 10 is a fragmentary front elevational view of the mechanism of FIG. 9.

FIG. 11 is an enlarged sectional view of a modified form of a switch-tripping mechanism.

Figure 1:
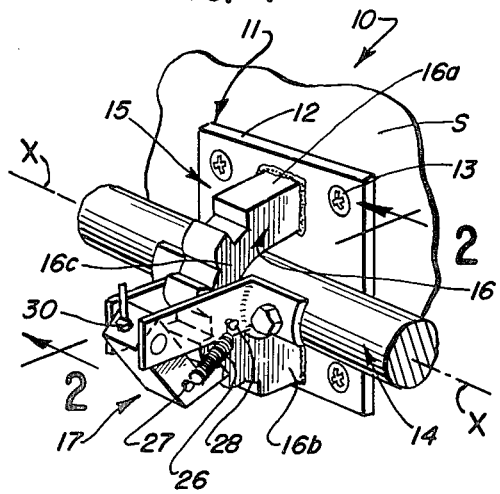
FIG. 1 is a fragmentary front perspective view of one embodiment of the improved lock mechanism and showing the lock components thereof in an interlocking relation.
Figure 4:
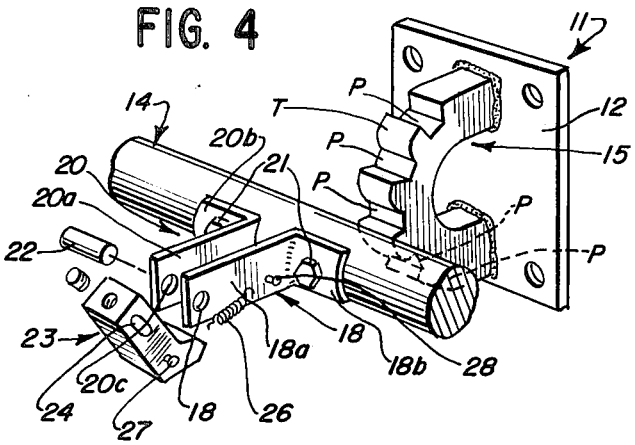
FIG. 4 is a fragmentary front perspective view of the mechanism of FIG. 1 but showing the various parts thereof in exploded relation.
Figure 3:
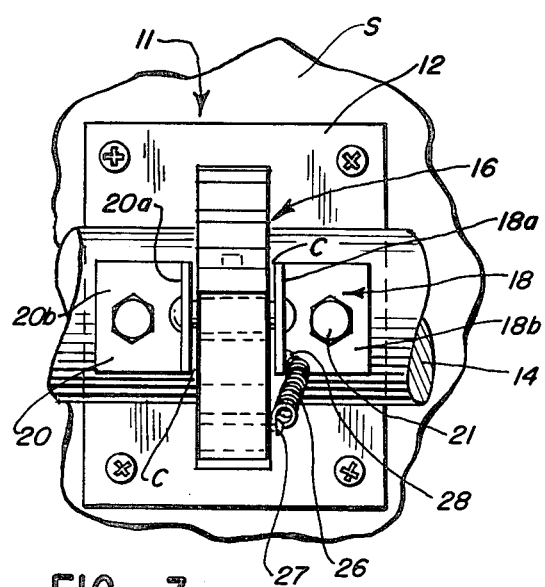
FIG. 3 is a fragmentary front elevational view of the mechanism shown in FIG. 1.

Referring now to the drawings and more particularly to FIGS. 1-4 one form of the improved lock mechanism 10 is shown. The mechanism 10 includes a first member 11 which in the illustrated embodiment is in the form of a mounting plate 12 fixedly secured by a plurality of anchor screws 13 or the like to a stationary vertical wall surface S. A substantially horizontally disposed rodlike, or tubular, second member 14 is mounted forwardly of the plate 12 and is adapted to pivot about its longitudinal axis X—X between an inoperative position and a plurality of selected operative positions as will be described more fully hereinafter. The second member 14 is urged by gravitational forces or the like to assume an inoperative position.

Carried on plate 12 is a first lock component 15, which, in the illustrated embodiment, is in the form of a C-shaped element 16 having the legs 16a, 16b thereof affixed to the exposed surface of plate 12. The element 16 is in substantially straddling relation with member 14. The central or bail segment 16c of element 16 has a rounded, or curved, exterior surface with the center of curvature thereof substantially coincident with the pivotal axis X—X.

The exterior surface of segment 16c is provided with a plurality of annularly spaced pockets P. The number of pockets and the shape and relative spacing thereof may vary from that shown without departing from the scope of the invention. The pockets in segment 16c are formed by gear teeth T which separate adjacent pockets. It will be noted in FIG. 2 that one face $T_1$ of each tooth is substantially planar and is disposed in a radial plane extending through the pivotal axis X—X. The opposite surface $T_2$ of each tooth is rounded for reasons to be explained more fully hereinafter.

A second lock component 17 is affixed to member 14 and pivots therewith as a unit. Lock component 17, as seen more clearly in FIG. 4, includes a pair of elongated brackets 18, 20 each of which is affixed to the exterior of member 14 and projects substantially radially outwardly therefrom. The C-shaped element 16 is sandwiched between the outwardly projecting, substantially parallel, portions 18a, 20a of brackets 18, 20. There is sufficient clearance C between the element 16 and the adjacent bracket portions 18a, 20a to permit unobstructed relative pivotal movement between the bracket portions and the C-shaped element 16, see FIG. 3. The inner end portions 18b, 20b of the brackets are fixedly secured by welding or the like to the exterior of member 14. Anchor-fasteners 21 may also be used to affix bracket portions 18b, 20b to member 14, as seen more clearly in FIGS. 1, 3 and 4.

Formed adjacent the outer ends of bracket portions 18a, 20a and disposed outwardly of the annular periphery of element 16 are aligned openings 18c, 20c which are adapted to snugly accommodate therein end portions of a pivot pin 22. The axis of pin 22 is in spaced substantially parallel relation to the axis X—X.

Figure 2:
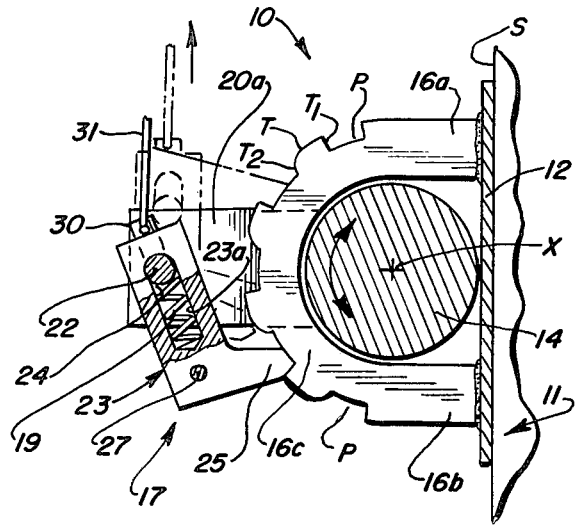
FIG. 2 is an enlarged fragmentary sectional view taken along line 2—2 of FIG. 1 and showing in phantom lines the second lock component in an unlocked position.

Disposed intermediate bracket portions 18a, 20a and mounted to pivot about pin 22 is a pawl 23. An elongated slot 24, closed at opposite ends, is formed in pawl 23. The slot 24 is sized relative to the diameter of pin 22 so that the pawl pivotal axis can shift relative to the pawl only longitudinally of the slot. As seen in FIG. 2, the pawl 23 is provided with an elongated cavity 23a open at one end, which is disposed transversely of the axis of pin 22 and extends from one end of the pawl to a point beyond the lower end of the slot 24. The cavity 23a is adapted to accommodate a coil spring 19 having one end thereof contacting pin 22 and the opposite end contacting the lower blind end of the cavity 23a. The spring 19 causes the pin axis 22 to be normally disposed at the upper end of slot 24 as seen in FIG. 2. The spring 19 will permit the member 14 to pivot a few degrees (e.g., 2°-3°) in a counterclockwise direction relative to member 11 to compensate for an increased torque being applied to member 14 while the pawl still remains in an interlocking relation with member 16.

The lower exterior of pawl 23 is provided with a protuberance or nose portion 25 which is shaped so as to project into one of the pockets formed in the periphery of element 16 and abut surface $T_1$ of the tooth adjacent the selected pocket and releasably restrain movement of member 14 towards an inoperative position. In the mechanism shown in FIG. 2, the inoperative position of member 14 is when the pawl protuberance 25 is disposed adjacent the mounting plate 12 or surface S and beneath leg 16b.

Each pocket in element 16 corresponds to a particular relative position of pivotal adjustment of member 14 with respect to member 11. The pawl 23 is biased by a spring 26 so that nose portion 25 will automatically engage a pocket when the nose portion is in proper alignment therewith. As seen in FIG. 1, one end of spring 26 is connected to a lug 27 formed on pawl 23 and the opposite end of the spring is connected to a similar lug 28 formed on portion 18a of bracket 18.

Because of the rounded configuration of tooth surface $T_2$, the nose portion 25 of the pawl will slidably move out of the pocket and over an adjacent tooth, when member 14 pivots in a clockwise direction about axis X—X until the selected pocket is reached, whereupon the nose portion will abut tooth surface $T_1$ adjacent the selected pocket as the member 14 reverses its direction of rotary movement and seeks to return to its inoperative position. Thus, the pawl and member 16 function as a rachet.

Formed at the upper portion of pawl 23 is a further lug 30 to which is connected one end of a release cable 31 or other suitable means. The lug 30 may be threaded or otherwise fitted into the open end cavity 23a if desired. The cable is provided to facilitate manual release of the pawl from an interlocking relation with a peripheral pocket. Upon an upward force being applied to the cable, as seen in FIG. 2, which is sufficient to overcome the combined force of springs 19 and 26, the pawl will pivot and also slide relative to the peripheral pocket of segment 16c by reason of the slot 24 in which the pivot pin 22 is disposed so that the pawl nose portion will clear the teeth T formed in member portion 16c. The teeth T may project about a half inch or less from the base of the adjacent pockets. The length of slot 24 is sufficient to enable the pawl to move relative to element 16 in order to effect unlocking of the pawl from the pocket.

The free end of the cable 31 may be disposed in a convenient, yet remote, location for the operator to apply the necessary release force. By having the cable flexible it will readily compensate for the various operative and inoperative positions assumed by the member 14 with respect to member 12. The brackets 18, 20, pivot pin 22, pawl 23 and bias spring 26 move as a unit with member 14.

Figure 5:
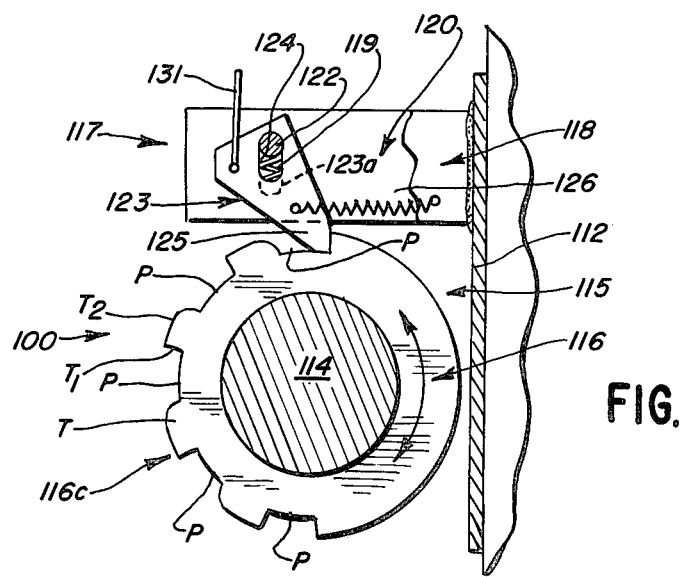
FIG. 5 is similar to FIG. 2 but showing a second form of the improved lock mechanism.

FIG. 5 discloses a second form of the improved lock mechanism 100. Parts of mechanism 100 which correspond to the parts of mechanism 10 will be given the same identifying numeral but in a one hundred series. The principal distinctions from a structural standpoint between mechanisms 10 and 100, are that in mechanism 100 the first lock component 115 is attached to and pivots as a unit with the pivoting member 114, and the second lock component 117 is affixed to and protrudes from the stationary member 111. Component 115 is in the form of an annular collar or ring 116 which is affixed to and projects radially from the periphery of member 114. A peripheral segment 116c of collar 16 is provided with a plurality of annularly spaced pockets P which are adapted to receive the protruding nose portion 125 of the pawl 123. The upper portion of the pawl is provided with an elongated slot 124 through which extends a pivot pin 122; and an interior cavity 123a in which is disposed a coil spring 119. The ends of pin 122 are supported by a pair of spaced substantially parallel brackets 118, 120. The brackets are affixed to and project outwardly from a mounting plate 12. The brackets in mechanism 100 are disposed above the periphery of collar 116, thus preventing any obstruction between the brackets and the collar when member 114 is adjusted to various operative positions. Because of the vertical offset disposition of the pawl relative to the axis X—X of member 114, gravity force will cause the pin 122 to be normally disposed at the upper end of slot 124 when the nose portion 125 is aligned with a pocket. To assist the nose portion 125 in making abutting contact with the surface $T_1$ of a selected tooth, a coil spring 126 is utilized which biases the pawl in a counterclockwise direction about pin 122, see FIG. 5.

The pawl 123 is manually adjusted to an unlocked position by means of a cable or suitable means 131. Upward force applied to cable 131 and of an amount sufficient to overcome the bias of springs 119 and 126 will cause the pawl 123 to move upwardly relative to pin 122 and at the same time cause the pawl to pivot in a clockwise direction relative to pin 122 until the pawl clears the selected pocket of collar 116. Once the nose portion is out of engagement with the teeth T of member 116, the latter is free to pivot in a counterclockwise direction, as seen in FIG. 5, to an inoperative position.

FIGS. 6–8 disclose a third embodiment 200 of the improved lock mechanism shown in combination with an apparatus 300 used in conjunction with a loading dock operation. The apparatus may be of a type disclosed in pending application for U.S. Pat. Ser. No. 911,053 filed on May 30, 1978. Briefly, the apparatus 300 includes a hook-shaped element 301 which is fixedly connected to a portion of member 214 and is spaced axially a substantial distance from the lock mechanism 200. The element 301 moves as a unit with member 214 between operative and inoperative modes. The apparatus 300 and the locking mechanism 200 in such an arrangement are mounted on the outer vertical wall S of a loading dock against which the back end of a truck or similar vehicle is parked during loading and unloading. When element 301 and member 214 are in an operative mode, a portion 130a of element 301 engages behind a depending bumper cross member, not shown, which is normally mounted on the rear end of the truck and, thus, retains the truck in a proper position against the loading dock.

In mechanism 200, the first member 211 is provided with a pair of axially spaced journal bearings 211a, 211b which provide support for one end portion of member 214. The opposite end of member 214 has fixedly mounted thereon the apparatus 300, as aforementioned.

Positioned between bearings 211a, 211b are the first and second lock components 215, 217, respectively. First lock component 215 embodies a substantially C-shaped element 216 similar to that described with respect to lock mechanism 10. Element 216 has ends 216a, 216b thereof affixed to a mounting plate 212. The plate 212 is anchored to the vertical front wall S of the loading dock. Element segment 216c is provided with a plurality of annularly spaced peripheral pockets P. The number of pockets will depend upon the number of selected operative positions or modes desired for apparatus 300. As in the case of mechanism 10, element 216 is sandwiched between a pair of brackets 218, 220 which are affixed to and project radially from member 214. The outer distal ends of brackets 218, 220 are interconnected by a handle assembly 250 having an end piece 250a, which is affixed to the bracket distal ends and maintains the proper spacing therebetween. Projecting radially outwardly from piece 250a is an elongated handle grip 250b which is provided with a finger-opening 250c. The handle 250 provides a convenient means for manually adjusting the hook-shaped element 301 of apparatus 300 and also member 214 from an inoperative position or mode to a selected operative position or mode. Grip 250b is also provided with a laterally disposed guide opening 250d through which the pawl release cable 231 is adapted to extend. In addition to cable 231, a second cable 231a may be provided which can be utilized to move member 217 and in turn member 214 in a clockwise direction about the longitudinal axis X—X to a selected position with respect to member 211, as seen in FIG. 7, without having to manually grip the handle 250.

Mechanism 200 is shown in FIGS. 6–8 in association with an audio and/or visual alarm system 260 which will readily indicate to the operator or others in the area when the element 301 is in an operative or inoperative mode. System 260 includes a wall mounted housing or box 261 on which is carried a pair of illuminating elements 262a, 262b (see FIG. 6) or a buzzer or the like, now shown. Connected to box 261 by suitable wiring 263 is a switch 264, which is fixedly mounted adjacent the periphery of member 214 and is adapted to effect selective energizing of one or the other of the illuminating elements 262a, 262b. Attached to the periphery of member 214 and extending outwardly (tangentially, radially, or the like) therefrom is a trigger finger 265 which pivots as a unit with member 214. The finger 265 is aligned with switch 264 so that when member 214 has been released from its locked position and moved counterclockwise to its fullest extent and the apparatus element 301 is in an inoperative mode, the finger 265 will depress switch button 264a whereupon one of the illuminating elements 262a will be energized, see FIG. 8. When button 264a is not depressed, the other illuminating element 262b will be energized, see FIG. 7.

In place of finger 265, a cam 265', shown in FIG. 11, may be utilized to actuate switch 264. Cam 265' is mounted directly on the peripheral exterior of member 214. Switch 264 is preferably held in an upright position beneath member 264 by an outwardly extending bracket B affixed to the loading dock wall S.

Thus, by observing which illuminating element is energized, the loading dock operator can readily tell without having to observe the apparatus 300 directly whether element 301 is in an operative or inoperative mode and, thus, whether it is safe to load or unload the parked truck or vehicle. Furthermore, by properly locating the housing 261 at a loading dock, the driver of the parked truck or vehicle can observe from the truck cab whether the truck is free of element 301 and may be safely moved away from the loading dock.

The box 261 is connected to a suitable electrical power source, not shown, by wiring 266. The lengths of wiring 263, 266 will vary depending upon the location of the box 261 with respect to the switch 264 and power source, not shown.

In lieu of electricity as a power source, the audio and/or visual alarm system 260 may be hydraulically or pneumatically powered or may be actuated solely through mechanical means. Furthermore, only one illuminating element may be utilized instead of two or more. Also, if desired, the system could combine both audio and visual features.

A fourth form of the improved locking mechanism 400 is shown in FIGS. 9, 9a and 10. The various parts of mechanism 400 which correspond to parts of mechanism 100 will be identified by the same numbers but in a four hundred series. Mechanism 400 is similar in operation to that of mechanism 100 in that the first lock component 415 is attached to the outer periphery of member 414 and rotates as a unit with the latter about axis X—X. The second lock component 417 is connected to and protrudes from a stationary wall member 411.

Component 415, as shown in FIG. 9, is in the form of a circular ring section 416 which is affixed by welding or the like to and projects outwardly from the periphery of member 414. The length or arcuate dimension of section 416 is such that member 414 can pivot from an inoperative position to one of a plurality of selected operative positions relative to member 411 without interference between section 416 and a mounting plate 412. When member 414 is in an inoperative position, one end of section 416 will assume a position I, shown in phantom lines in FIG. 9. On the other hand, when member 414 is disposed in its greatest angular operative position with respect to its inoperative position, the opposite or second end of component 415 will assume position II, also shown in phantom lines in FIG. 9. Thus, by reason of section 416, not completely encircling member 414, the axis of rotation X—X of member 414 may be moved closer to the exposed surface of the mounting plate 412.

The arcuate exposed surface of section 416 is provided with a plurality of annularly spaced pockets P which are separated from one another by a plurality of teeth T. The configuration and number of the teeth T formed on section 416 may correspond to those provided on the collar 116 of mechanism 100, see FIG. 5, and will depend upon the number of operative positions the member 414 is to assume relative to the member 411.

Pawl 423 of mechanism 400 has a substantial L-shaped configuration with the end 423b of the longer leg 423c thereof bifurcated and pivotally connected by pin 422 to a bracket 450 which is affixed to the mounting plate 412. The bracket 450 is provided with an elongated, vertically extending closed-end slot 424 through which the pin 422 extends in a transverse direction. The size of the slot relative to the diameter of the pin is such that the pin shifts longitudinally of the slot but not in a lateral direction when the pin is assembled with the pawl and bracket. Besides the slot 424, an elongated centrally disposed cavity 451 is formed in bracket 450. The longitudinal axes of slot 424 and cavity 451 are parallel or coaxial to one another. The upper end of cavity 451 is exposed and the lower end thereof terminates within the bracket 450, see FIG. 9a. Positioned within cavity 451 is a coil spring 419 which biases the pin 422 to normally assume a position at the upper end of slot 424.

The shorter leg or distal end of the L-shaped pawl 423 forms a nose portion 425 which is shaped so as to readily fit within any of the pockets P formed in the exterior of the circular ring section 416 carried by rotary member 414. When the pawl nose portion 425 is disposed within a pocket, the rotary member 414 is restrained from moving in a counterclockwise direction about axis X—X, see FIG. 9. If mechanism 400 is used in combination with the truck loading apparatus 300, see FIG. 6, whereby the hook-shaped element 301 thereof engages the underside of a rear bumper of the truck parked adjacent the apparatus, increased torque may be exerted on the element and in turn on the member 414 by the truck as the latter is being loaded. To compensate for this increased torque and to relieve any deleterious stress which might otherwise result in the locking mechanism components, the pivot pin 422 will move downwardly relative to the bracket slot 424 and overcome the bias of spring 419 while at the same time having the pawl nose portion remain in interlocking relation with one of the teeth adjacent the selected pocket or ring section 416.

In order to be assured that the pawl nose portion 425 will project into a pocket P of ring section 416, when the pocket and nose portion are in properly aligned relation, a second spring 426 is provided. One end of the spring is connected to the pawl 423 itself and the opposite end of the spring is connected to either the mounting plate 412 or to a portion of the bracket 450 adjacent the plate.

To release the pawl nose portion from a locking relation with a section pocket P, manual force may be applied to the pawl through a handle H which is connected to the upper side of the pawl and at a substantial distance from pin 422. Because the handle has a substantial length as compared to the distance between the point of attachment of the handle to the pawl and the pin 422, a substantial mechanical advantage is effected whereby a relatively small amount of manual force need be applied to outer end (not shown) of the handle H in order to move the pawl in a clockwise direction about pin 422 and thereby release the pawl nose portion from a pocket. A cable, similar to cable 231 of mechanism 200, may be substituted for and used in conjunction with the handle H to effect unlocking of the pawl and the ring section pockets.

Thus, it will be seen that an improved locking mechanism has been provided which is of simple, sturdy, yet compact construction and is reliable in retaining a rotatably mounted member in selected positions of rotary adjustment relative to a second member. Furthermore, the improved mechanism is simple to operate and is operable under widely varying atmospheric conditions.

We claim:

1. A releasable lock mechanism comprising a stationary first member; a second member mounted adjacent said first member for rotary movement relative to said first member between an inoperative idel position and a plurality of selected operative positions annularly spaced from said inoperative position, said second member including means offset from the rotary axis thereof urging said second member to normally assume said inoperative position; a first lock component carried by one of said members and having at least a curved peripheral segment provided with a plurality of annularly spaced pockets, each pocket corresponding to a selected operative position of said second member relative to said first member, the center of curvature of the first lock component peripheral segment being substantially coaxial with the rotary axis of said second member; and a pivotally adjustable second lock component carried by the other of said members and being in interlocking engagement with a peripheral pocket when said second member is in a selected operative position, said lock components, when in interlocking engagement, effecting retention of said second member in a selected operative position, said second lock component having means to transversely shift the pivotal axis thereof relative to the said other member upon a predetermined manual external force being applied to said second lock component in a direction away from the peripheral segment of said first lock component whereby said second lock component assumes an unlocked position.

2. The mechanism of claim 1 wherein the first lock component is carried by said stationary first member.

3. The mechanism of claim 1 wherein the first lock component is carried by said second member and is rotatable therewith as a unit.

4. The mechanism of claim 1 wherein the second lock component includes a bracket affixed to one of said members and projecting therefrom, said bracket having at least a portion thereof spaced outwardly from the pocketed peripheral segment of said first lock component; an elongated pawl having an elongated slot formed therein and a protuberance spaced from said slot and interlockingly engaging a pocket of said first lock component when said second member is in a selected operative position, said pawl having opposite side surfaces thereof provided with elongated openings communicating with said slot and being substantially coextensive with the longitudinal dimension of said slot; and means supported by said bracket portion for pivotally connecting said pawl thereto, said means having at least a section disposed within said elongated slot and the openings in said pawl side surfaces whereby said section and said pawl are movable relative to one another in a direction longitudinally of said slot when the predetermined manual external force is being applied to said second lock component.

5. The mechanism of claim 1 wherein the second lock component includes a bracket affixed to one of said members and projecting therefrom, said bracket having at least a portion thereof spaced outwardly from the pocketed peripheral segment of said first lock component, said bracket portion being provided with an elongated slot having an end in closer proximity to the rotary axis of the second member than the other end of the slot, said bracket portion having opposite side surfaces provided with elongated openings communicating with said slot and being substantially coextensive with the longitudinal dimension of said slot; and a pawl having means carried thereby for pivotally connecting said pawl to said bracket, and protruding means spaced from said connecting means and interlockingly engaging a pocket of said first lock component when said second member is in a selected operative position, said pawl pivotally connecting means having at least a portion thereof disposed within the bracket slot and the side surface opening, the pivotal axis of said pawl and the bracket being shiftable relative to one another only in a direction longitudinally of said slot and said side surface openings, said pawl pivotal connecting means being biased to normally assume a position adjacent an end of said elongated slot.

6. The mechanism of claim 5 wherein the second lock component bracket is affixed to said first member and the first lock component is carried by said second member.

7. The mechanism of claim 6 wherein the first lock component is affixed to the outer periphery of said second member and is movable therewith as a unit about the rotary axis of the latter, said first lock component being in the form of a circular ring section and having the ends thereof spaced from said first member when said second member is in an inoperative position or any one of the selected operative positions.

8. A releasable lock mechanism comprising a stationary first member; a second member mounted adjacent said first member for rotary movement relative to said first member between an inoperative idle position and a plurality of selected operative positions annularly spaced from said inoperative position, said second member including means offset from the rotary axis thereof urging said second member to normally assume said inoperative position; a first lock component carried by one of the members and having at least a curved peripheral segment provided with a plurality of annularly spaced pockets, each pocket corresponding to a selected operative position of said second member, the center of curvature of the first lock component peripheral segment being substantially coaxial with the rotary axis of said second member; and a complemental pivotally connected second lock component carried by the other member and interlockingly engaging a predetermined pocket of said first lock component, when said second member assumes a selected operative position, means for shifting the pivotal axis of said second lock component, when the latter interlockingly engages a predetermined pocket, wherein said second lock component is shiftable relative to the engagement between said second lock component and said predetermined pocket as a point of reference while said lock components remain in interlocking relation.

* * * * *

UNITED STATES PATENT AND TRADEMARK OFFICE
CERTIFICATE OF CORRECTION

PATENT NO. : 4,267,748
DATED : May 19, 1981
INVENTOR(S) : Lynn O. Grunewald, Steven J. Hipp It is certified that error appears in the above-identified patent and that said Letters Patent are hereby corrected as shown below:

Column 4, Line 41  —  "collar 16" should be -- collar 116 --

Column 4, Line 50  —  "plate 12" should be -- plate 112 --

Column 5, Line 22  —  "portion 130a" should be -- portion 301a --

Column 6, Line 4   —  "now shown" should be -- not shown --

Column 7, Line 45  —  "loading" should be -- locking --

Column 7, Line 58  —  "pocket or ring" should be -- pocket of ring --

Column 8, Line 26  —  "idel" should be -- idle --

Signed and Sealed this

Eleventh Day of August 1981

[SEAL]

Attest:

GERALD J. MOSSINGHOFF

Attesting Officer       Commissioner of Patents and Trademarks